O. N. GARNESS.
SAW SET.
APPLICATION FILED DEC. 15, 1913.
1,103,668.
Patented July 14, 1914.
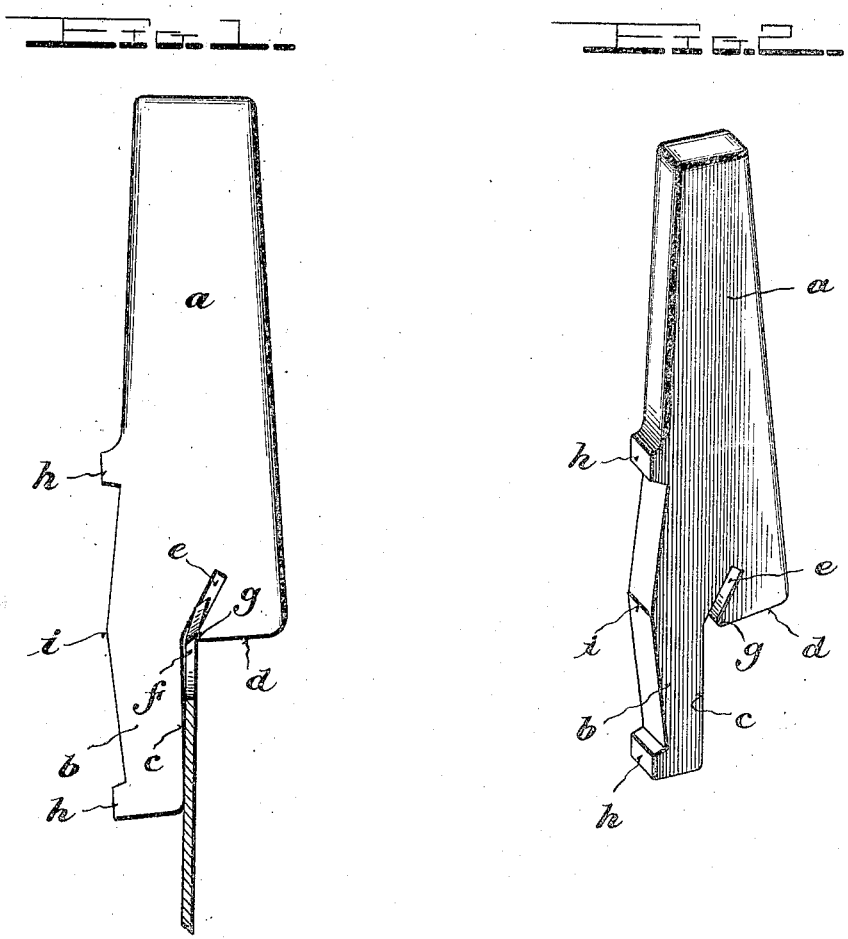
Witnesses
Chas. L. Griesbauer.
W. H. Gross
Inventor
O. N. Garness
By Davis & Davis
Attorneys

UNITED STATES PATENT OFFICE.

OLE N. GARNESS, OF BELLINGHAM, WASHINGTON.

SAW-SET.

1,103,668. Specification of Letters Patent. Patented July 14, 1914.

Application filed December 15, 1913. Serial No. 806,775.

*To all whom it may concern:*

Be it known that I, OLE N. GARNESS, a citizen of the United States, and a resident of Bellingham, county of Whatcom, State of Washington, have invented certain new and useful Improvements in Saw-Sets, of which the following is a full and clear specification, reference being had to the accompanying drawings, in which:—

Figure 1 is a side elevation showing the device in the act of setting a saw tooth; and Fig. 2 is a perspective view of the device.

The object of this invention is to provide a simple tool by means of which saw teeth may be easily and quickly set, the construction being such that all breaking and battering of the teeth will be avoided and the device will be adapted to set saws of soft or hard metal and of thick or thin gage, as more fully hereinafter set forth.

Referring to the drawing by reference characters, $a$ designates the body or shank of the tool, which consists of a bar of tool steel having depending from one of its lower corners a finger $b$ whose inner face $c$ is vertical and lies at substantially a right angle to the adjacent face $d$ of the lower end or offset portion of the tool body $a$. Projecting upwardly and to the right from the juncture of the face $d$ with the face $c$ or in said offset portion is an inclined slot $e$.

In using this device, it is placed on top of the tooth to be set, as shown in Fig. 1, and hammered down until the tooth shown at $f$ is forced into the inclined slot far enough to give it the set desired. While the tooth is being forced into the slot, it will be seen that the tooth will be gripped by the acute nose $g$ of a tongue, (formed by the juncture of the face $d$ and the adjacent wall of the slot $e$) and the upper wall of the inclined slot $e$, while the adjacent face of the brace finger $b$ will be pressed hard against the adjacent face of the saw body, thus gripping the saw at three points. This gripping action is caused by the inclining of the slot $e$ upwardly and to the right of the face $c$ of the finger $b$, and as a tooth is forced into the slot, it is bent around the acute nose, which offers only a slight frictional resistance to the passage of the tooth, and thereby avoids any tendency of drawing or rupturing the metal. If the slot $e$ were inclined to the left, it will be seen that the tendency would be to swing the depending end of the brace or finger $b$ away from the saw body, and thus permit the tool to have an unsteady or rocking movement in the act of hammering it down on the saw tooth.

With my device, the harder the saw metal (and consequently the harder the blows needed to drive the tool on to the tooth), the tighter will be the gripping action of the tool on the saw, and consequently the quicker and easier will be the act of setting the tooth, reducing the danger of breaking the tooth to a minimum. This increased steadiness of operation obviously also conduces to quickness and accuracy in setting the tooth.

With my device, the lower end of the tool takes care of itself, so to speak, since the very act of driving the tool on to the tooth causes it to grip the saw.

By preference the upper part or body of the tool is made long enough to be grasped by the hand while driving it on to the saw. It will be understood that in view of the peculiar action of my device, it will be unnecessary to grip the tool with a firmness anything more than sufficient to hold it in place until it is started, after which it practically holds itself in place until the desired set is obtained. By preference also, I provide a series of projections $h$ and $i$ on the back edge of the brace $b$ and shank $a$ for the purpose of gaging the set of the teeth in the usual manner.

Having thus described my invention, what I claim is:

A saw tooth setting tool, comprising a body having a depending finger provided with a vertical wall, an offset portion located to one side of said vertical wall, an inclined slot formed in said offset portion, the same being inclined upwardly into said offset portion and having its open end located at the juncture of said vertical wall and the lower face of said offset portion, the upper side of said slot being a continuation of said vertical wall, and the portion between the lower face of said offset portion and the lower side of said slot forming a tongue having an acute nose located substantially opposite and near the juncture of the upper side of the slot and vertical wall of the finger.

In testimony whereof I hereunto affix my signature in the presence of two witnesses.

OLE N. GARNESS.

Witnesses:
  LILLIAN LEHMAN,
  GEORGE LIVESEY.

Copies of this patent may be obtained for five cents each, by addressing the "Commissioner of Patents, Washington, D. C."